July 23, 1963

C. W. McELROY ETAL 3,098,455

CARGO CUSHIONING SYSTEMS

Filed Aug. 17, 1961

INVENTORS.
CHARLES W. MCELROY
JOHN S. KLEIN
BY
BLAIR AND BUCKLES
ATTORNEYS.

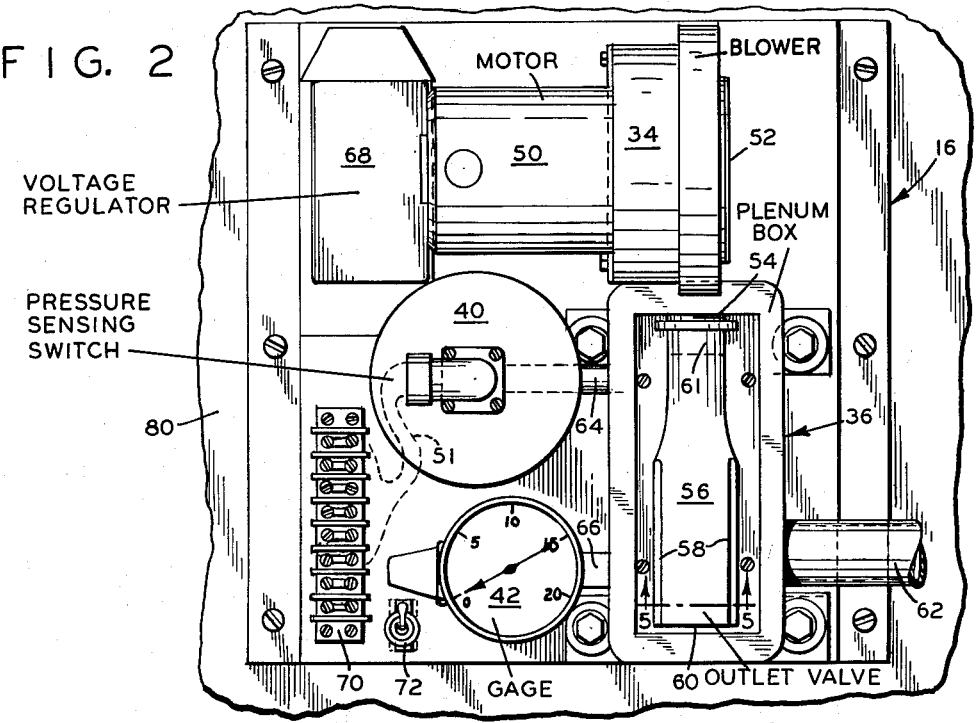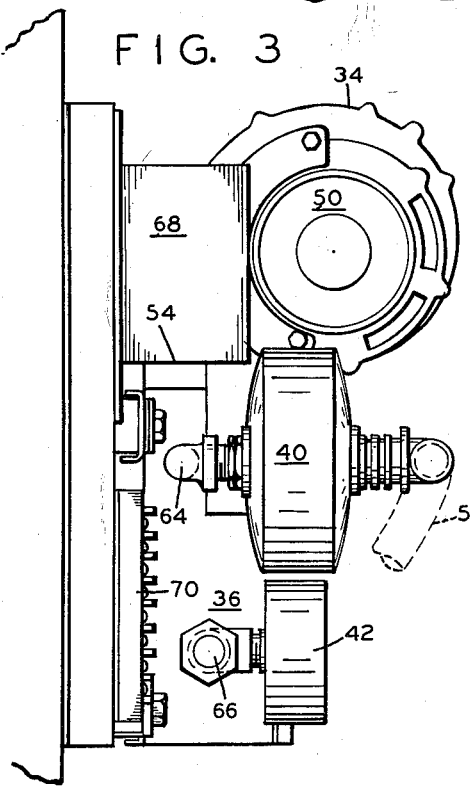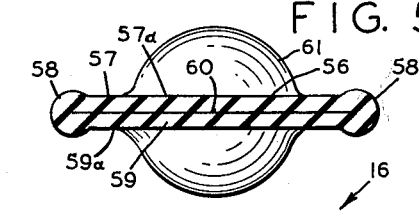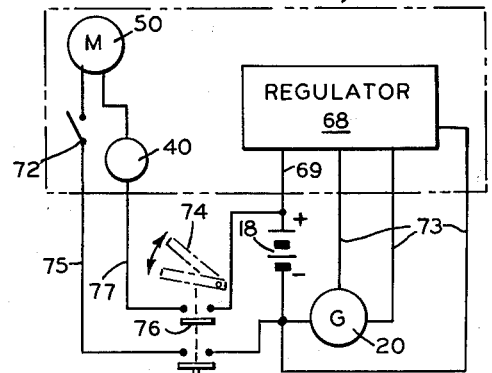

United States Patent Office 3,098,455
Patented July 23, 1963

3,098,455
CARGO CUSHIONING SYSTEMS
Charles W. McElroy and John S. Klein, Hamden, Conn., assignors to Safety Electrical Equipment Corp., New Haven, Conn.
Filed Aug. 17, 1961, Ser. No. 132,182
8 Claims. (Cl. 105—369)

This invention relates to a system and apparatus wherein pneumatic shock absorbers are packed between boxes of freight and more particularly to systems and apparatus wherein the air pressure in the shock absorbers is controlled under a wide variety of conditions.

The problem of providing effective protection against damage to cargo during shipment has existed from the time that goods were first transported, and a number of devices and systems have been devised in an attempt to reduce such damage effectively during shipment. The problem is particularly important in the shipping of goods by rail, since the great bulk of all goods shipped is transported in railroad freight cars. Further the freight is subject to a great amount of vibration and shock during transit. In order to insure the arrival of goods in an intact condition, a great amount of money has been expended for new methods and apparatus for crating, packing and otherwise cushioning goods in transit.

One approach to solving the problem of damage to cargo is exemplified in United States Patent No. 2,856,867 in which a number of inflatable bags or bladders are suspended in a railroad car and are positioned between stacks of cargo. When inflated to the proper pressure these air bags act as shock absorbers and cushion the cargo during starting, stopping, lurching or other accelerations or disturbances when the car is moved. Our invention is an improvement over such systems and apparatus.

More specifically the pneumatic system disclosed in Patent No. 2,856,867 comprises a number of air filled shock absorbers which are supplied with compressed air and the air pressure in the shock absorbers must be controlled within predetermined limits to be effective. To supply the desired air pressure, a pressure tank or air reservoir is provided and piping from the reservoir with appropriate valves and controls admits air under pressure to the shock absorbers. The compressed air may be supplied to the reservoir from the compressed air system of the train itself.

One of the principal problems encountered in such systems is that the air pressure in the shock absorbers must be maintained within a predetermined limit or shock absorbing capacity, or the air bladders will be ineffective to produce the desired cargo-cushioning action. Extremes of temperature make it necessary to bleed air from the bladders or to supply more air in order to maintain the desired air pressure for effective shock absorbing. Changes in air pressure are primarily the effect of temperature changes and provision must be made for such changes. Railroad freight cars are moved from one part of the country to another and in a period of a day or two are exposed to wide variations in temperature. Even a standing car under normal conditions will be subjected to temperature variations of 40° or more in a single day. Therefore it is necessary that air be removed from or added to the bladders almost continually to provide an effective cargo cushioning system.

The prior art systems and apparatus have a number of disadvantages. These systems utilize an air reservoir and piping which are generally suspended below the freight car. Railroad cars are subject to a great amount of shock and vibration which frequently leads to air leaks in the system pipes. The air supply pipes also are prone to freeze during the winter months because of condensate in the system, thus blocking the pipes or jamming valves in the system. A further disadvantage is that the air reservoir and piping add unnecessary weight to the car. Still another disadvantage is that pressure in the air reservoir is generally about 90 p.s.i., and a mechanical pressure reducing valve is required to reduce the pressure to the system pressure of approximately three ounces per square inch. Such pressure reducing valves are expensive to manufacture and are much more prone to malfunction than are pressure control valves wherein the pressure differential is less extreme.

Therefore it is an object of this invention to provide a reliable system of cushioning cargo with pneumatic shock absorbers, affording dependable cushioning action over long operation periods.

Another object of the invention is to provide a system of the above character in which air pressure in the shock absorbers is maintained within predetermined limits.

A further object of the invention is to provide a system of the above character in which air piping and reservoirs outside the cargo carrying space are eliminated.

Another object of the invention is to provide a system of the above character which is capable of functioning properly under extreme conditions of shock, vibration and wide temperature variations.

Another object of the invention is to provide apparatus for systems of the above character which is compact, inexpensive to manufacture and economical to maintain.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a better understanding of the nature and objects of the invention, reference should be had to the following detailed description taken in connection with the accompanying drawing in which:

FIGURE 2 is a front elevation view of the compressor and pressure control sub-system of the invention;

FIGURE 3 is a side elevation view of the compressor and pressure control sub-system of FIGURE 2;

FIGURE 4 is a simplified schematic wiring diagram of a part of the system control and operating circuit; and FIGURE 5 is an enlarged sectional end view of the outlet valve element incorporated in the sub-system of FIGURE 2.

Like numbers refer to like parts throughout the various views in the drawings.

Figure 1:
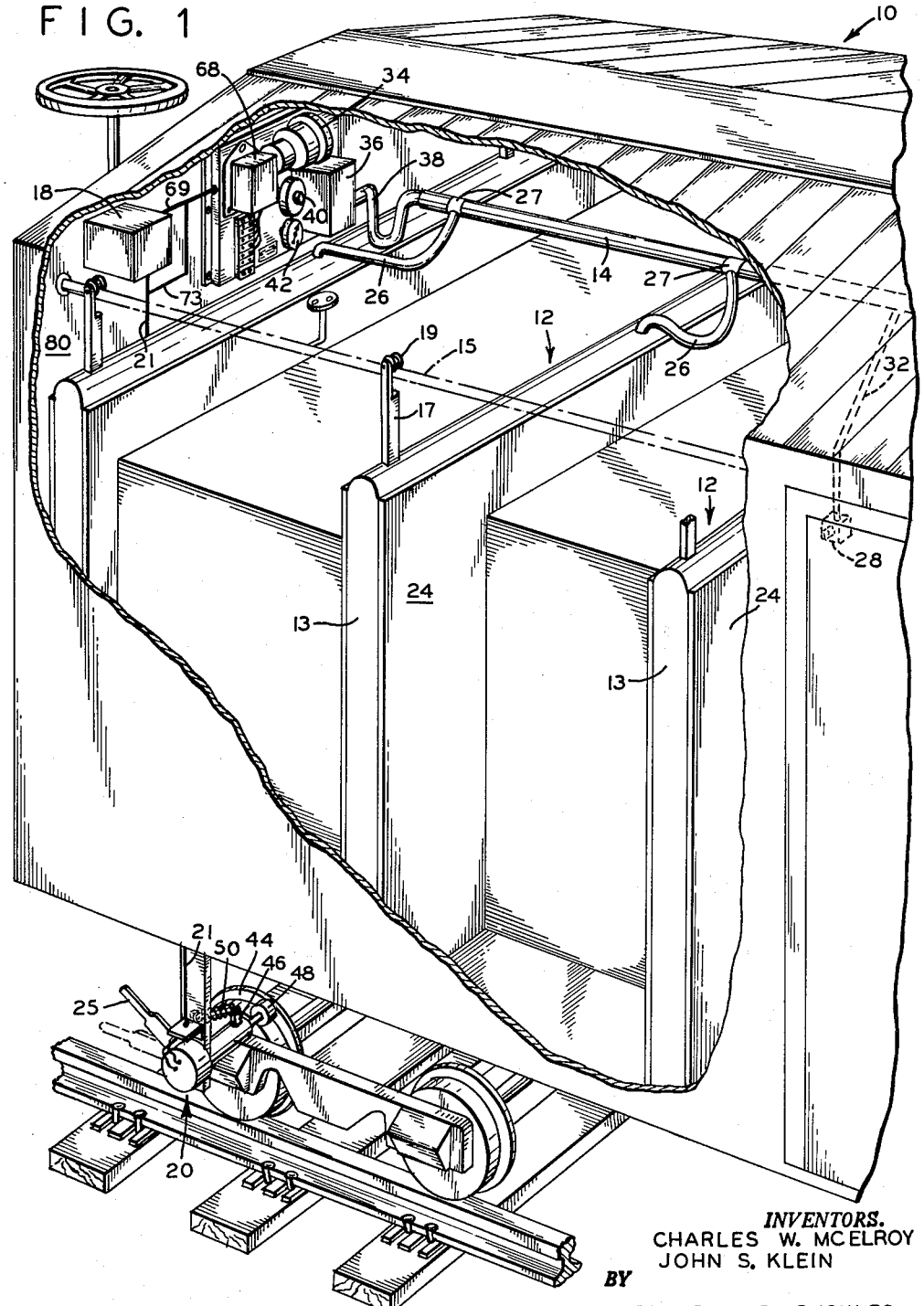
FIGURE 1 is a partial perspective view of a railroad freight car employing the invention, with a portion of the car cut away.

As can be seen in FIGURE 1, the system of the invention generally comprises a railroad car 10 having a number of pneumatic shock absorbers 12, which are spaced between cargo units 22. The shock absorbers are inflated after the car is loaded, and their pressure is maintained within predetermined limits through a central air distributing manifold 14. Connected to manifold 14 is a compact compressed air supply and control sub-system generally indicated at 16, which may be attached to the bulkhead at one end of the railroad car. A nickel-cadmium battery or batteries 18 is also positioned on the bulkhead and is recharged by a selectively engageable generator 20 which is powered by the railroad car wheel when desired. The batteries provide power for the air supply and control sub-system 16 when the car is not moving.

The system and apparatus of our invention has a number of advantages. No air reservoir or unnecessary piping is required since the air pressure supply and control system is completely electrically powered. By eliminating the air reservoir and piping, the system is much lighter in weight than prior art systems. The electrical wiring joining the batteries to the generator and to the air supply sub-system is much easier to protect against vibration and shock than is piping and is therefore much more reliable in operation. By eliminating such piping outside the car there is very little chance that piping or valve will freeze, which may readily occur in prior art systems.

The air supply is provided by a compressor as needed, thus eliminating the need for complex and expensive reducing valves to reduce air pressure from as much as 90 p.s.i. in a reservoir to three ounces p.s.i. in the shock absorbers. Thus not only is the system of our invention less expensive to manufacture and install, but also less prone to malfunction in operation. As will be explained more fully hereinafter the air supply and control of the system is relatively simple and is effective under a number of operating conditions. Still a further advantage of the instant invention is that the system may be powered by any other source of D.C. current such as an automobile battery during emergencies.

The invention will now be described in more detail. Referring to FIGURE 1, it is seen that the railroad freight car 10 is provided with a number of pneumatic shock absorbers 12 which are placed between crates of freight 22. The shock absorber comprises an inflatable bladder 13 which may be of rubber, rubber impregnated cloth or a like inflatable material with facings 24 on each side to protect the bladder against punctures and to equalize pressure on the freight. The facings are preferably of plywood but may be made of any suitable sheet material. The shock absorbers may be suspended from a longitudinal rod 15 (shown in dashed outline in FIGURE 1) by strap connections 17 which are provided with rollers 19 for easy movement of the shock absorber along the car.

The shock absorber bladders are inflatable through a central manifold pipe 14 having flexible connecting hoses 26 which may be removably connected to the manifold at 27. Thus the shock absorbers may be positioned at the center of the car and moved into position successively with the hoses 26 connected to the manifold as the shock absorbers and the cargo stacks are alternately positioned during loading. A pressure relief valve 28 may be positioned near the car door 30, and is connected to the manifold by a conduit 32. Valve 28 may be solenoid or manually operated to quickly remove air from the system prior to loading or unloading. If the valve is solenoid operated it is not necessary to position it near the car door.

Air pressure for the system is supplied and maintained by the sub-system 16 shown in detail in FIGURES 2 and 3, which is preferably secured to the car bulkhead 80. Such system 16 includes a centrifugal blower 34, which supplies air under pressure through a plenum box 36 and thence to the manifold 14 via flexible coupling 38 (FIGURE 1). The pressure switch 40 controls the system pressure within preselected limits, and a pressure gauge 42 is provided for visual indication of system pressure. The system is powered by nickel-cadmium batteries 18 (FIGURE 1) which may also be secured to the car bulkhead 80. The batteries power the system as required and the car therefore need not be moving to maintain air pressure in the shock absorbers.

A generator 20 is connected via wiring 21 to charge the batteries 18 and is selectively engageable with the car wheel 44 through a toggle linkage 46 and spring 50 by operation of handle 25. Thus the generator driving roller 48 may be urged against the car wheel or may be moved to a disengaged position, as desired.

Referring now to FIGURES 2 and 3, the air supply and control subassembly 16 will be described in more detail. The blower 34 is driven by a D.C. electric motor 50 and has an air intake 52 and an air discharge outlet 54. Blower outlet 54 connected to the air-distributing plenum box 36 through a flat valve 56, which has an opening 60 at its end for passing air into the plenum box and thence to the shock absorber system. The valve generally comprises a circular connecting neck 61 and flattens toward the exit opening 60. The valve therefore is a flat tube for at least one half of its length and is preferably of rubber. As shown in FIGURE 5 the sides 57 and 59 of the tube are closed together by air pressure on their outer surfaces 57a and 59a and opened by pressure through the opening 60. In extensive testing of the system it has been found that ordinary flap valves of rubber are subject to deterioration along the edges of the valve due to vibration and shock. The life of the valve 56 has been greatly extended by providing a relatively heavy bead of rubber along each of its edges 58, as shown in the sectional view of FIGURE 5. Due to its large surface area, the flap valve is very effective in preventing air from escaping from the low pressure shock absorber system in a reverse direction through the blower 34 when the blower is not operating. Such a check valve is very inexpensive to manufacture and its beaded side construction pointed out above has been found to be long lasting and reliable in operation.

The plenum box itself forms a central air pressure distribution point, and is provided with other openings which are connected in an air-tight manner to other parts of the system. Connector 62 joins with the flexible manifold connector 38 and connecting tubes 64 and 66 provide system air connections to the pressure switch 40 and pressure gauge 42 respectively.

The pressure switch 40 senses the pressure in the system via tube 64 leading to plenum box 36, thus enabling switch 40 to control the operation of the blower motor 50. The blower motor 50 is energized whenever system pressure drops below the predetermined level. The pressure switch also controls a pressure relief valve, which may be a remote solenoid operated valve 28, or a different valve incorporated into the pressure switch itself (not shown). When the pressure in the shock absorbers is not within the preselected limits the pressure switch 40 operates either the blower motor 50 or the pressure relief valve until the pressure again falls within the preselected limits. Thus pressure switch 40 via its sensing tube 64 automatically maintains the pressure in the shock absorber system at the proper level.

As shown in FIGURES 2 and 3, the subassembly 16 also includes a voltage regulator 68 for controlling generator input to the batteries and to the pressure control sub-system. A terminal strip 70 provides readily accessible connections for the system wiring 51 and connections for remote control of the system if desired. Switch 72 provides for manual control of the blower and the on-off pressure switch.

Referring now to FIGURE 4, the control and power circuitry will be explained in more detail. As seen in the schematic diagram, the battery 18 is charged by the generator 20 through the voltage regulator 68 via electrical connections 69 and 73. In operation the motor 50 and pressure switch 40 can be supplied with current from the battery or generator as needed via electrical connections 75, 77 which includes a pair of contacts 76, 78 and switch 72 on the pressure control panel 16. Switch contacts 76, 78 are operated through a switch lever 74, which may be connected to the generator toggle link 46 (FIGURE 1) so that the pressure switch and motor are de-energized whenever the generator is disengaged from the car wheel. Thus whenever the generator driving roller 48 is disengaged from the car wheel, contacts 76, 78 will be closed to provide power to the motor and pressure switch. Even with contacts 76, 78 closed however, the operation of pressure switch 40 and motor 50 is subject to on-off control by switch 72. Thus, whenever it is desired to engage the generator merely for charging the batteries, for example, the switch 72 may be opened to prevent operation of the blower and control mechanism of the system.

Operation

The operation of the system and apparatus of the invention is illustrated by the following freight loading and transporting operation. Initially the connectors 26 of the shock absorbers are disconnected and the deflected shock absorber cushions 12 are positioned near the center of the freight car. Since the shock absorber cushions are preferably suspended on rollers 17, which run on longitudinal rods 15, the positioning of the shock absorbers is easily accomplished by one man.

On-off switch 72 is closed to its "on" position prior to loading, and as shown in FIGURE 1, one of the shock absorber cushions may be positioned against the car bulkhead 80. Connector 26 is then secured to the manifold and boxes of cargo 22 are stacked against the shock absorber cushion. A second shock absorber cushion is then moved into position against the other side of the cargo stack 22. Connector 26 is secured at 27 on the manifold 14 and another row of freight is loaded against the panel 24 of the exposed shock absorber cushion.

The loading operation in which the shock absorbers are sandwiched between rows of cargo stacks is repeated, starting at each end of the car, and after the last or central rows of freight are loaded with the deflated shock absorbers between the freight, pressure relief valve 28 is closed and the door of the car may then be closed.

If the car is to be in transit or moved in the classification yard in a reasonably short time, the generator 20 is placed into engagement with the car wheel. Movement of the generator into this position closes contacts 76, 78 and energizes the system. With low pressure in the system, the pressure switch 40 immediately connects battery 18 to blower motor 50, and air pressure is supplied to all shock absorbers through the valve 56 and plenum box 36, via the central manifold 14 and connectors 26. As the shock absorber cushions inflate to the proper pressure the boxes of freight are secured into place by expansion of the shock absorbers, and the air filled bladders provide a cushion to take up any jolts or sudden acceleration movement of the cargo when the car is moved.

During transit or when the car is standing still for short periods, pressure in the system is kept substantially constant by the pressure switch 40, operating to bleed the system when the pressure is too high or to actuate the blower and motor 50 when the pressure drops too low. Thus, despite temperature changes, the pressure in the shock absorbers will always be within the predetermined limits which are set on the pressure switch 40. The pressure may be varied as desired depending upon the type of cargo to be shipped and the amount of jolting or shock which is expected during transit.

When the car reaches its destination generator 20 is disengaged from the car wheel to de-energize the pressure control sub-system 16, the door 30 is opened and bleed valve 28 is opened, either manually or automatically by the opening of the door. The shock absorbers are deflated to release the cushioning on the freight, and the cargo stacks are then unloaded in reverse order, i.e. a row of boxes is removed, and the shock absorber is disconnected and moved out of the way to expose the next row of freight. After the car has been unloaded, the shock absorbers are left in position at the center of the car for the next loading operation.

In the event that the freight car is to be transported empty the generator may be engaged merely to charge the batteries, in which case control switch 72 will be opened to de-energize the control and blower system.

While the illustrative embodiment disclosed has been confined to rail transportation it should be understood that the invention is applicable to a number of other cargo conveyances or vehicles such as trucks, aircraft or ships.

As pointed out above, our invention provides a shock absorber system wherein the energy is stored as electricity and in which a number of the problems present in the prior art have been eliminated. With the system of our invention there is greatly reduced danger of freezing pipes or valves or of damaged reservoirs or pipes beneath the car itself. The high differential pressure reducing valves of the prior art systems has been eliminated, thus reducing the cost of manufacture and a source of trouble in operation. The pressures generated and handled by the control system do not even approach the high pressure present in the air reservoirs of the prior art.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention what we claim as new and desire to secure by Letters Patent is:

1. A cargo cushioning system, comprising, in combination:
   (A) an air manifold, having
      (a) an air inlet and
      (b) an air outlet;
   (B) a plurality of inflatable dunnage bags,
      (a) each connectable for inflation to said air manifold;
   (C) a check valve,
      (a) at said air manifold inlet,
      (b) said check valve allowing air to enter said manifold through said air inlet but not allowing air to exit therethrough;
   (D) an air blower
      (a) having an air intake and an air discharge outlet,
         (1) said air discharge outlet connecting through said check valve to said air manifold, and
         (2) said air intake open to the atmosphere;
   (E) an electric motor
      (a) drivingly connected to said air blower;
   (F) a source of electrical energy;
   (G) a low pressure sensitive switch
      (a) having a pressure sensing element connected to said air manifold
      (b) said switch connecting said electric motor to said source of electrical energy when the pressure in said manifold drops below a first predetermined pressure; and,
   (H) high pressure sensitive relief means
      (a) at said air outlet of said air manifold,
      (b) said relief means opening to allow air to escape from said manifold when the pressure therein is greater than a second predetermined pressure.

2. The combination defined in claim 1 in which said source of electrical energy comprises a battery.

3. The combination defined in claim 1 wherein said source of electrical energy comprises a generator.

4. The combination defined in claim 1 wherein said source of electrical energy comprises a generator adapted to be driven by a rotating member of a vehicle.

5. The combination defined in claim 1 wherein said source of electrical energy comprises, in combination:
   (a) a battery,
   (b) a generator adapted to be driven by a rotating member of a vehicle, and
   (c) a voltage regulator for connecting said generator to said battery to charge said battery.

6. The combination defined in claim 1 wherein said air blower produces at the air discharge outlet thereof a pressure only slightly greater than said first predetermined pressure and wherein said check valve comprises:

(a) a plenum chamber having an inlet and an outlet
    (1) the inlet thereof being connected to the air discharge outlet of said air blower,
    (2) the outlet thereof being connected to the air inlet of said air manifold, (b) an elongated flat tubular member,
    (1) of flexible material having a relatively large surface area and
    (2) closed side edge means forming an inlet and an outlet opening at each end of said tubular member,
        (i) the inlet of said tubular member being connected to the inlet of said plenum chamber, and
        (ii) the outlet of said tubular member being within the interior of said plenum chamber.

7. A cargo cushioning system comprising, in combination:

(A) a closed cargo carrying vehicle;
(B) an air manifold within said vehicle having
    (a) an air inlet and
    (b) an air outlet;
(C) a plurality of inflatable dunnage bags, within said vehicle,
    (a) each connectable for inflation to said air manifold;
(D) a check valve within said vehicle,
    (a) connected to said air manifold inlet,
    (b) said check valve allowing air to enter said manifold through said air inlet but not allowing air to exit therethrough;
(E) an air blower within said vehicle,
    (a) having an air intake and an air discharge outlet,
        (1) said air discharge outlet being connected through said check valve to said air inlet of said air manifold, and
        (2) said air intake being open to the atmosphere within said vehicle;
(F) an electric motor within said vehicle
    (a) drivingly connected to said air blower,
(G) a battery within said vehicle;
(H) a low pressure sensitive switch within said vehicle
    (a) having a pressure sensing element connected to said air manifold and
    (b) said switch connecting said electric motor to said battery when the pressure in said air manifold drops below a first predetermined pressure; and,
(I) high pressure sensitive relief means within said vehicle
    (a) connected to said air outlet of said air manifold,
    (b) said relief means opening to allow air to escape from said manifold when the pressure therein is greater than a second predetermined pressure.

8. The combination defined in claim 7 and:
(J) a battery charger on said vehicle
    (a) for charging said battery and
    (b) adapted to be driven by a rotating member of said vehicle.

References Cited in the file of this patent
UNITED STATES PATENTS

| | | |
|---|---|---|
| 978,062 | Russell et al. | Dec. 6, 1910 |
| 1,181,240 | Munyan | May 2, 1916 |
| 1,555,287 | Howe | Sept. 29, 1925 |
| 2,662,724 | Kravagna | Dec. 15, 1953 |
| 2,960,942 | Pier et al. | Nov. 22, 1960 |